US012536279B2

United States Patent
Nakano et al.

(10) Patent No.: US 12,536,279 B2
(45) Date of Patent: Jan. 27, 2026

(54) EXTRACTION DEVICE, EXTRACTION METHOD, AND EXTRACTION PROGRAM

(71) Applicant: NTT, Inc., Tokyo (JP)

(72) Inventors: Hiroki Nakano, Musashino (JP); Daiki Chiba, Musashino (JP)

(73) Assignee: NTT, Inc., Tokyo (JP)

( * ) Notice: Subject to any disclaimer, the term of this patent is extended or adjusted under 35 U.S.C. 154(b) by 341 days.

(21) Appl. No.: 18/031,624

(22) PCT Filed: Oct. 14, 2020

(86) PCT No.: PCT/JP2020/038732
§ 371 (c)(1),
(2) Date: Apr. 13, 2023

(87) PCT Pub. No.: WO2022/079823
PCT Pub. Date: Apr. 21, 2022

(65) Prior Publication Data
US 2023/0394142 A1 Dec. 7, 2023

(51) Int. Cl.
*H04L 9/40* (2022.01)
*G06F 16/955* (2019.01)
*G06F 21/55* (2013.01)

(52) U.S. Cl.
CPC ........ *G06F 21/554* (2013.01); *G06F 16/9566* (2019.01); *H04L 63/1483* (2013.01)

(58) Field of Classification Search
None
See application file for complete search history.

(56) References Cited

U.S. PATENT DOCUMENTS

| | | | | |
|---|---|---|---|---|
| 8,356,352 | B1 * | 1/2013 | Wawda | G06F 21/53 726/22 |
| 8,966,582 | B1 * | 2/2015 | Ainslie | H04L 63/14 726/22 |
| 9,083,729 | B1 * | 7/2015 | Doshi | H04L 63/1408 |
| 10,685,008 | B1 * | 6/2020 | Kurve | G06F 16/23 |
| 10,944,789 | B2 * | 3/2021 | Correa Bahnsen | H04L 63/1483 |
| 11,394,722 | B2 * | 7/2022 | Price | G06F 21/55 |
| 11,595,437 | B1 * | 2/2023 | Mushtaq | H04L 63/20 |
| 11,886,597 | B2 * | 1/2024 | Vlissidis | G06F 18/24 |

(Continued)

FOREIGN PATENT DOCUMENTS

CN 109472027 A 3/2019

OTHER PUBLICATIONS

Rafique et al., "It's Free for a Reason: Exploring the Ecosystem of Free Live Streaming Services", NDSS, Available Online at: https://www.ndss-symposium.org/wp-content/uploads/2017/09/free-reason-exploring-ecosystem-free-live-streaming-services.pdf, Feb. 21-24, 2016, 15 pages.

*Primary Examiner* — Khang Do
(74) *Attorney, Agent, or Firm* — XSENSUS LLP

(57) ABSTRACT

An extraction device includes processing circuitry configured to access an entrance URL described in user-generated content generated by a user in a plurality of services in a predetermined period to extract a feature quantity of the user-generated content, perform training by using the extracted feature quantity of the user-generated content generated by a normal user and a feature quantity of content generated by a malicious user, and determine whether or not the user-generated content has been generated by the malicious user using a trained model.

11 Claims, 18 Drawing Sheets

(56) References Cited

U.S. PATENT DOCUMENTS

| | | | | |
|---|---|---|---|---|
| 2012/0192277 | A1* | 7/2012 | Jakobsson | H04L 63/145 |
| | | | | 726/22 |
| 2012/0254333 | A1* | 10/2012 | Chandramouli | G06F 40/10 |
| | | | | 709/206 |
| 2014/0047413 | A1* | 2/2014 | Sheive | G06F 8/33 |
| | | | | 717/110 |
| 2014/0090055 | A1* | 3/2014 | Palumbo | H04L 63/145 |
| | | | | 726/22 |
| 2015/0264105 | A1* | 9/2015 | V. | H04L 67/02 |
| | | | | 709/201 |
| 2016/0173510 | A1* | 6/2016 | Harris | H04L 63/20 |
| | | | | 726/23 |
| 2017/0230320 | A1* | 8/2017 | Knight | H04L 51/10 |
| 2018/0097822 | A1* | 4/2018 | Huang | G06N 20/00 |
| 2018/0330244 | A1* | 11/2018 | Morris | G06Q 30/0241 |
| 2019/0141057 | A1* | 5/2019 | Burgis | H04L 63/1483 |
| 2019/0230129 | A1* | 7/2019 | Digiambattista | H04L 63/1441 |
| 2020/0036750 | A1* | 1/2020 | Bahnsen | H04L 63/1416 |
| 2020/0204987 | A1* | 6/2020 | Inaba | B61L 15/0072 |
| 2020/0213322 | A1* | 7/2020 | Anand | H04L 63/0876 |
| 2020/0285737 | A1* | 9/2020 | Kraus | G06F 21/552 |
| 2020/0374313 | A1* | 11/2020 | Manoselvam | G06N 20/00 |
| 2021/0117552 | A1* | 4/2021 | Vlissidis | G06F 18/24 |
| 2021/0120035 | A1* | 4/2021 | Onut | H04L 63/1483 |
| 2021/0185080 | A1* | 6/2021 | Wang | H04L 63/1408 |
| 2021/0258791 | A1* | 8/2021 | Jochem | H04W 12/66 |
| 2021/0312041 | A1* | 10/2021 | Gururajan | G06F 16/353 |
| 2024/0056480 | A1* | 2/2024 | Onut | H04L 63/1483 |

* cited by examiner

Fig. 4

```
Japan vs United States Free live streaming click here
   (japan vs united, vs united states, united states free, states free live,
   free live streaming, live streaming click, streaming click here)
```

Fig. 7

```
Input: USER-GENERATED CONTENT SET U
Output: TEXT FEATURE QUANTIY SET T
  for u ∈ U do
      URL EXISTING IN URL_u = u, TEXT OF TEXT_u = u
      URL_u⇐WordSegmentation(URL_u)
      VEC=WordEmbeddings(TEXT_u,URL_u)
```
$$t = \frac{1}{sizeOf(VEC)} \sum\nolimits_{i=1}^{sizeOf(VEC)} VEC_i$$
```
  t append to T
  return T
```

Fig. 8

```
Input: USER-GENERATED CONTENT SET U, TIME THRESHOLD
VALUE σ, AND SIMILARITY THRESHOLD VALUE τ
Output: GROUP FEATURE QUANTITY SET G
  for u∈U do
    Time_u = POSTING DATE AND TIME OF u
    U_near=GroupNearTimePost(U,Time_u, σ)
    U_sim=Minhash-LSH(U_near, τ)
    g=CreateGroupFeatures(U_sim)
    g append to G
  return G
```

Fig. 9

1. Free live streaming URL1 URL1 @user1
   SAME GROUP: AVERAGE POSTING TIME INTERVALS OF 2, 3, 1, 2, 3, SIZE OF SET 3, NUMBER OF UNIQUE USERS OF SET 2, NUMBER OF UNIQUE URLS OF SET 2, AND NUMBER OF AVERAGE URLS OF ONE CONTENT 1.67
2. Live Streaming Japan URL1 URL2 @user2
   SAME GROUP: AVERAGE POSTING TIME INTERVALS OF 1, 3, 1, 2, 3, SIZE OF SET 3, NUMBER OF UNIQUE USERS OF SET 2, NUMBER OF UNIQUE URLS OF SET 2, AND NUMBER OF AVERAGE URLS OF ONE CONTENT 1.67
3. Live Streaming Free URL1 @user2
   SAME GROUP: AVERAGE POSTING TIME INTERVALS OF 1, 2, 1, 2, 3, SIZE OF SET 3, NUMBER OF UNIQUE USERS OF SET 2, NUMBER OF UNIQUE URLS OF SET 2, AND NUMBER OF AVERAGE URLS OF ONE CONTENT 1.67
4. Free iPhone Giveways URL3 @user3
   SAME GROUP: AVERAGE POSTING TIME INTERVALS OF 4, 5, 4, 5, SIZE OF SET 2, NUMBER OF UNIEQUE USERS OF SET 1, NUMBER OF UNIQUE URLS OF SET 2, AND NUMBER OF AVERAGE URLS OF ONE CONTENT 1
5. iPhone Giveways URL4 @user3
   SAME GROUP: AVERAGE POSTING TIME INTERVALS OF 4, 5, 4, 5, SIZE OF SET 2, NUMBER OF UNIQUE USERS OF SET 1, NUMBER OF UNIQUE URLS OF SET 2, AND NUMBER OF AVERAGE URLS OF ONE CONTENT 1
6. Trump President Party URL5 @user4
   NO SAME GROUP
7. Corona Virus NEWS Sites URL6 @user5
   NO SAME GROUP

Fig. 11

CHARACTER STRING "rugby world cup" IS INCLUDED

SERVICE a:
   Text:England vs Argentina LIVE: Rugby World Cup updates as...England take on Argentina in the Rugby World Cup and Express...England vs Argentina LIVE:Rugby World Cup updates as Eddie...Rugby World Cup free live stream LIVE>> http://bit[.]ly/rugby-world-cup-
   Username: coinmaster547 PostDate: 2019/10/05
   URL:https://twitter.com/coinmaster547/status/1180417464464596993

SERVICE b:
   Text:https://pbr-2019-4k.blogspot[.]com/ Rugby World Cup 2019 Rugby World Cup 2019.TV channel,time,live stream information.Watch Rugby World Cup 2019 Game On ITV,Sky Sports,BT Sport,Eurosport and more.
   Username:Steamz-Net-Zone-117898112929759 PostDate:2019/9/20
   URL:https://www.facebook.com/events/tokyo-stadium/rugby-world-cup-2019-live-stream-free/2144160735879174/

ARRIVAL URL:
   https://watchhdlivetv[.]online/PBR
   https://sportshdstream[.]com/4k2/index.html?a=2&clickid=5e79a6da0a5df40001216799&pubid=6018&bg2=rugbyb.jpeg&bg1=rugbyb.jpeg&q=Unlimited%20Live%20Rugby

EXTRACTION DEVICE, EXTRACTION METHOD, AND EXTRACTION PROGRAM

CROSS-REFERENCE TO RELATED APPLICATION

The present application is based on PCT filing PCT/JP2020/038732, filed Oct. 14, 2020, the entire contents of which are incorporated herein by reference.

TECHNICAL FIELD

The present invention relates to an extraction device, an extraction method, and an extraction program.

BACKGROUND ART

A social engineering (SE) attack which abuses the vulnerability of the user's mind is becoming the mainstream as a threat on the Web. As a guide route to a malicious Web site, user-generated content such as a video, a blog, and a writing on a bulletin board generated by an attacker by an online service and posted on the Web is increasing.

On the other hand, a large amount of user-generated content generated by an attacker is generated intensively in real time with respect to an event such as a specific concert or sports even as a target, and spread to normal users on a large number of services. Therefore, a wide-range detection technology having a high speed and high accuracy is expected.

For example, a technology for analyzing Web content of a fraud site has been disclosed in the related art (see NPL 1).

CITATION LIST

Non Patent Literature

[NPL 1] M. Zubair Rafique, et al., "It's Free for a Reason: Exploring the Ecosystem of Free Live Streaming Services", [online], [Retrieved on Jul. 27, 2020], Internet <URL: ndss-symposium.org/wp-content/uploads/2017/09/free-reason-exploring-ecosystem-free-live-streaming-services.pdf>

SUMMARY OF INVENTION

Technical Problem

However, because the related art is a technology using a feature amount specialized for false live stream site fraud, there is a problem that a detection range is limited.

The present invention has been made in view of the foregoing circumstances and an object of the present invention is to perform rapid and accurate detection of malignant sites over a wide area.

Solution to Problem

In order to solve the above-described problem and to achieve the object, an extraction device according to the present invention includes: processing circuitry configured to: access an entrance URL described in user-generated content generated by a user in a plurality of services in a predetermined period to extract a feature quantity of the user-generated content; perform training by using the extracted feature quantity of the user-generated content generated by a normal user and a feature quantity of content generated by a malicious user; and determine whether or not the user-generated content has been generated by the malicious user using a trained model.

Advantageous Effects of Invention

According to the present invention, it is possible to perform rapid and accurate detection of malignant sites over a wide area.

BRIEF DESCRIPTION OF DRAWINGS

FIG. 4 is a diagram illustrating processing of a generation unit.

FIG. 7 is a diagram illustrating processing of the calculation unit.

FIG. 8 is a diagram illustrating processing of the calculation unit.

FIG. 9 is a diagram illustrating processing of the calculation unit.

FIG. 11 is a diagram illustrating threat information.

DESCRIPTION OF EMBODIMENTS

Hereinafter, an embodiment of the present invention will be described in detail with reference to the drawings. The present invention is not limited to the embodiment. Further, in the description of the drawings, the same parts are denoted by the same reference signs.

Figure 1:
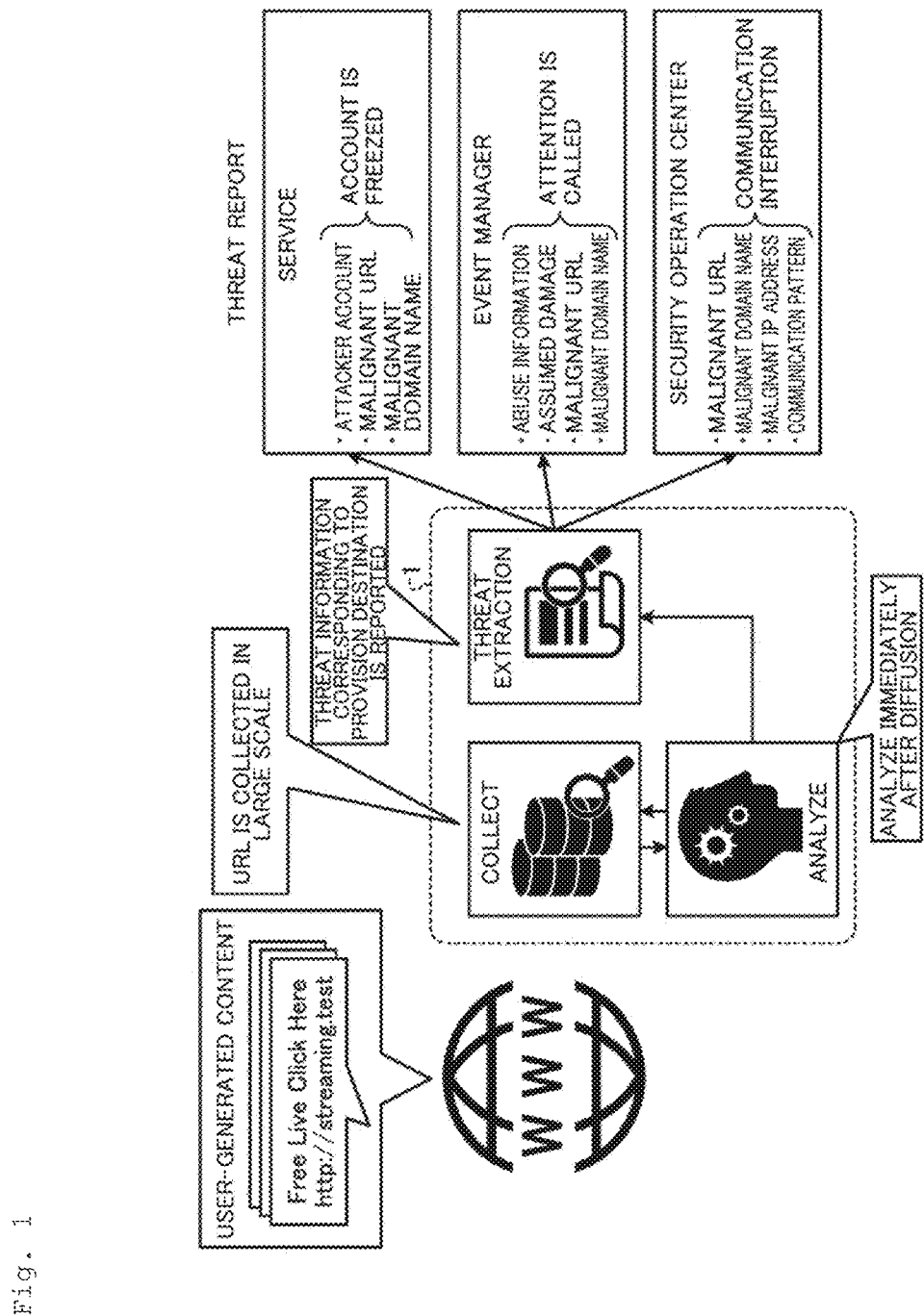
FIG. 1 is a diagram illustrating an overview of a detection device according to the present embodiment.

[Overview of Detection Device] FIG. 1 is a diagram illustrating an overview of the detection device. A detection device 1 according to the present embodiment collects user-generated content such as a video, a blog, and bulletin board writing generated by a user and posted on a Web in an online service such as Facebook (registered trademark) and Twitter (registered trademark), and performs analysis.

Specifically, attention is focused on the fact that an attacker intensively generates and diffuses a large amount of user-generated content with respect to an event to which a user pays attention, and the fact that the user-generated content is generated in a similar context such that the user wants to access a malicious site.

The detection device 1 efficiently collects user-generated content having a high likelihood of being malignant by the attacker by using a characteristic that the user-generated content by the attacker is diffused in a similar context at a specific timing, and performs analysis of whether or not the content is malignant. When it is determined that the content is malicious user-generated content as a result of the analysis, the detection device 1 extracts, from the malicious user-generated content, threat information which is a feature that may become a threat, and outputs a threat report.

For example, the detection device 1 extracts similar contexts of the user-generated content to generate a search query, and efficiently collects the user-generated content having a high likelihood of being malignant by using the search query. Further, the detection device 1 specializes in a specific service and performs training of a feature difference between the user-generated content generated by an attacker and user-generated content generated by a normal user to thereby perform a malignancy determination of a large amount of user-generated content of the specific service generated at the same time.

Further, the detection device 1 learns a feature difference of Web content obtained by accessing the URL described in user-generated content for the user-generated content generated by the attacker and the user-generated content generated by the normal user in an arbitrary service. The detection device 1 performs the malignancy determination on pieces of the user-generated content generated in a large amount by an arbitrary service at the same time by using the trained feature difference.

When it is determined that the content is malicious user-generated content, the detection device 1 extracts threat information that is a feature that can be a threat from the malicious user-generated content, and outputs a threat report. Thus, the detection device 1 detects an attack that may become a threat in real time.

Figure 2:
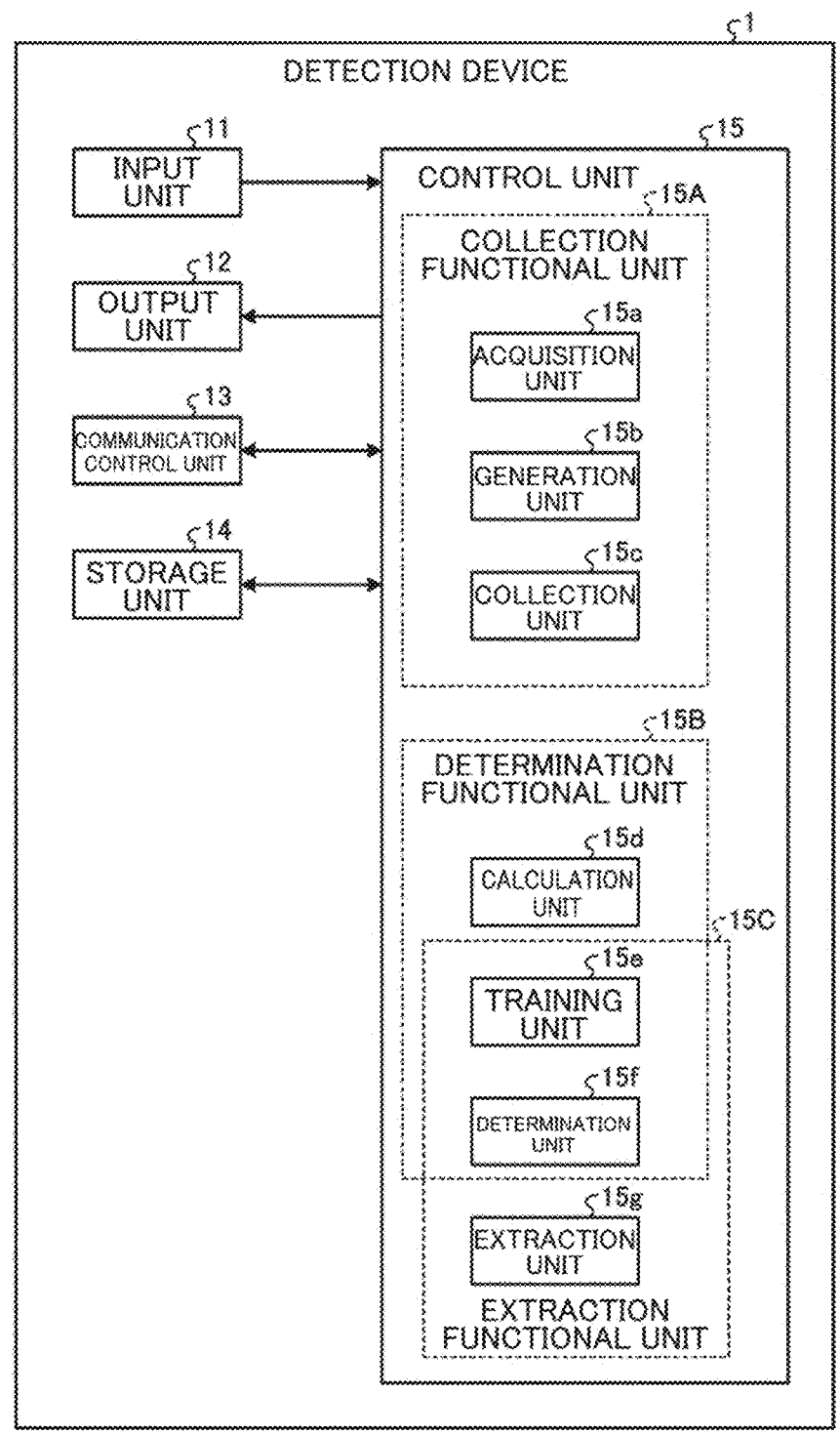
FIG. 2 is a schematic diagram illustrating an example of an overall configuration of the detection device according to the present embodiment.

[Configuration of Detection Device] FIG. 2 is a schematic diagram illustrating an example of an overall configuration of the detection device according to the present embodiment. As illustrated in FIG. 2, the detection device 1 of the present embodiment includes a collection functional unit 15A, a determination functional unit 15B, and an extraction functional unit 15C. These functional units may be implemented in hardware different from the detection device 1. That is, the detection device 1 may be implemented as a detection system including a collection device, a determination device, and an extraction device.

The detection device 1 is realized as a general-purpose computer such as a personal computer, and includes an input unit 11, an output unit 12, a communication control unit 13, a storage unit 14, and a control unit 15.

The input unit 11 is realized by using an input device such as a keyboard or a mouse, and inputs various pieces of instruction information, such as start of processing, to the control unit 15 in response to an input operation from an operator. The output unit 12 is realized by a display device such as a liquid crystal display, a printing device such as a printer, or the like. For example, a result of detection processing to be described below is displayed on the output unit 12.

The communication control unit 13 is realized by, for example, a network interface card (NIC), and controls communication between an external device and the control unit 15 via a telecommunication line such as a local area network (LAN) or the Internet. For example, the communication control unit 13 controls communication between a server or the like that manages user-generated content or the like for each service and the control unit 15.

The storage unit 14 is realized by a semiconductor memory device such as a random access memory (RAM) or a flash memory, or a storage device such as a hard disk or an optical disc. A processing program for operating the detection device 1, data used during execution of the processing program, and the like are stored in advance in the storage unit 14 or are stored temporarily each time the processing is performed. The storage unit 14 may also be configured to communicate with the control unit 15 via the communication control unit 13.

In the present embodiment, the storage unit 14 stores threat information and the like obtained as a result of the detection processing to be described below. Further, the storage unit 14 may store user-generated content acquired from a server or the like of each service by the acquisition unit 15a to be described below prior to the detection processing.

Description is returned to FIG. 2. The control unit 15 is realized using a central processing unit (CPU) or the like, and executes a processing program stored in a memory. Accordingly, the control unit 15 functions as the collection functional unit 15A, the determination functional unit 15B, and a extraction functional unit 15C, as illustrated in FIG. 2.

The collection functional unit 15A includes an acquisition unit 15a, a generation unit 15b, and a collection unit 15c. The determination functional unit 15B includes a calculation unit 15d, a training unit 15e, and a determination unit 15f. The extraction functional unit 15C includes an extraction unit a training unit 15e, and a determination unit 15f.

Each or some of these functional units may be implemented as different hardware. For example, as described above, the collection functional unit 15A, the determination functional unit 15B, and the extraction functional unit 15C may be implemented on different pieces of hardware as a collection device, a determination device, and an extraction device, respectively. Further, the control unit 15 may include another functional unit.

Figure 3:
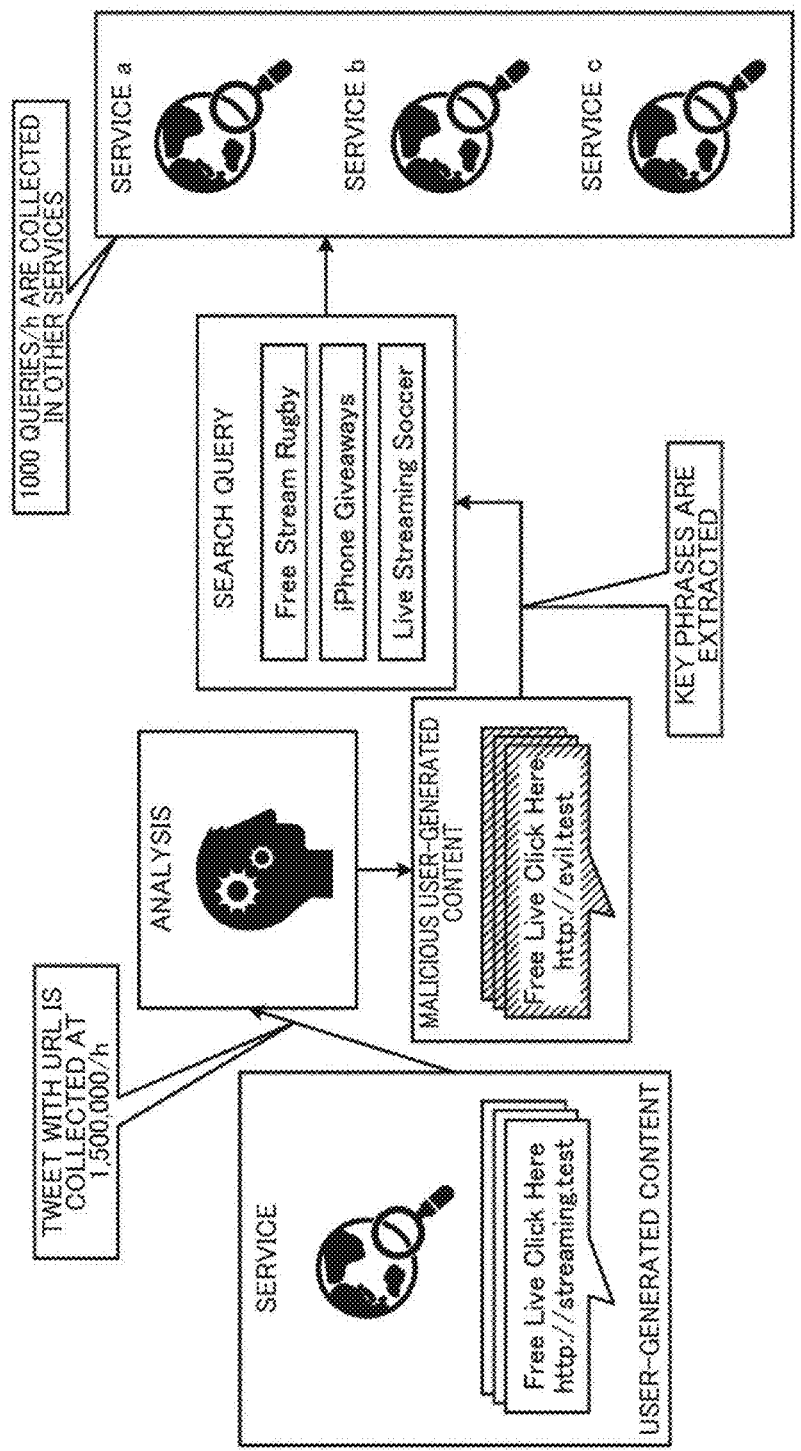
FIG. 3 is a diagram illustrating the processing of a collection functional unit.

[Collection Functional Unit] FIG. 3 is a diagram illustrating processing of the collection functional unit. As illustrated in FIG. 3, the collection functional unit 15A extracts similar context as a key phrase from a user-generated content group generated at the same time by a certain service, and generates a search query. Further, the collection functional unit 15A efficiently collects the user-generated content of an arbitrary service having a high likelihood of being malignant by using the generated search query of the key phrase having a high likelihood of being malignant.

The description will be returned to FIG. 2. The acquisition unit 15a acquires user-generated content generated in each service in a predetermined period. Specifically, the acquisition unit 15a acquires user-generated content from a server or the like of each service via the input unit 11 or the communication control unit 13.

For example, the acquisition unit 15a acquires user-generated content in which a URL is described for a predetermined service. In this case, the acquisition unit 15a may acquire the user-generated content periodically at predetermined time intervals or by designating a posting time using "because" and "until". Further, the acquisition unit 15a may acquire only the user-generated content in which the URL is described by using "filters". Thus, the acquisition unit 15a can acquire the user-generated content in which a URL of an external site is described in real time.

The acquisition unit 15a may store the acquired user-generated content in the storage unit 14, for example, prior to processing of a generation unit 15b to be described below. The generation unit 15b generates a search query by using words appearing in the user-generated content for each service. For example, the generation unit 15b generates a search query by using a combination of the appearing words.

Specifically, the generation unit 15b converts the acquired user-generated content into a feature vector of a predetermined number of dimensions. For example, the generation unit 15b sets a vector of a distributed expression of words representing a combination of words appearing in each user content as a feature vector of the user-generated content in a vector space representing a vocabulary appearing in the user-generated content, that is, a whole of appearing words. The generation unit 15b trains a model of the distributed expression of the words in advance and applies a sentence summarization technology. That is, a combination of words of the distributed expression similar to the distributed expression of the whole sentence (text) that is a target is extracted as a key phrase using the sentence summarization technology.

Thus, the generation unit 15b extracts a key phrase representing a context of each piece of user-generated content. The generation unit 15b generates a search query for searching for the user-generated content including the extracted key phrase.

Specifically, the generation unit 15b calculates a similarity between the whole text of the user-generated content and the key phrase candidate according to Equation (1) below. Here, doc is the whole sentence that is a target, C is a key phrase candidate, and K is a set of extracted combinations (phrase) of the words.

[Math. 1]

$$\text{KeyPhraseScore} := \arg_{C_i \in C/K}{}^{max}[\lambda \cdot \cos_{sin}(C_i, \text{doc}) - (1-\lambda)_{C_j \in K}{}^{max} \cos_{sin}(C_i, C_j)] \quad (1)$$

It is possible to extract various key phrases by changing λ in Equation (1) above.

For example, the generation unit 15b extracts a combination of words using an n-gram scheme for extracting n consecutive words from the text. The generation unit 15b calculates a cosine similarity between the whole text of the user-generated content and each extracted phrase of n-gram using Equation (1), and extracts a maximum phrase among phrases whose calculated similarity value is higher than a predetermined threshold value as a phrase key.

Here, FIG. 4 is a diagram illustrating processing of the generation unit 15b. In an example illustrated in FIG. 4, the generation unit 15b extracts a combination of words by using 3-gram. Further, the generation unit 15b calculates a cosine similarity between entire text of the user-generated content "Japan vs United States Free live streaming click here" and a phrase of each 3-gram "japan vs united", "vs united states", "united states free", . . . to extract a key phrase.

Alternatively, the generation unit 15b generates the search query by using an appearance frequency of each word. For example, the generation unit 15b totalizes a frequency of appearance of a phrase of 2-gram and a phrase of 3-gram in a text of the user-generated content acquired in a predetermined period. The generation unit 15b extracts a phrase whose appearance frequency is equal to or greater than a predetermined threshold value as a key phrase, and generates a search query for searching for user-generated content including the key phrase.

For example, the generation unit 15b extracts a phrase of a 3-gram from the text of all user-generated content posted every hour in 24 hours of March 1, and calculates the appearance frequency of each phrase. Then, the generation unit 15b extracts, as a key phrase, a phrase having a statistically abnormal value (outlier value) among phrases of 3-gram appearing in user-generated content for one hour of 0:00 to 1:00 on March 2 on the next day. That is, the generation unit sets the phrase as a key phrase when a large amount of user-generated content including phrases which do not appear normally are posted at a specific timing.

For example, the generation unit 15b calculates a positive outlier value by using z-score. In the example illustrated in FIG. 4, for the phrase "japan vs united", it is assumed that the number of times of appearance every one hour of 24 hours on March 1 is 0, 0, 0, 2, 4, 10, 2, 5, 10, 2, 4, 5, 6, 2, 2, 12, 20, 15, 20, 10, 20, 25, and 30. An average value in in this case is 8.792, and a standard deviation is 8.602.

Further, this phrase appears 50 times in one hour of 0:00 to 1:00 on March 2. In this case, z-score is calculated as Z=(50−8.792)/8.602=4.790. Further, when a threshold value of the outlier value is 1.96 corresponding to a significant appearance frequency 5%, the generation unit 15b generates a search query for searching for user-generated content including a key phrase with a phrase "japan vs united" as the key phrase.

Further, the generation unit 15b selects a search query which may become malignant for each service. For example, the generation unit 15b calculates a degree of malignancy of the generated search query on the basis of the search query used for the search for the user-generated content determined to be malignant most recently for each service. The generation unit 15b selects a search query whose degree of malignancy is equal to or greater than a predetermined threshold value as a search query of the service.

Here, the generation unit 15b calculates a ratio of the number of pieces of user-generated content determined to be malignant by using the number of pieces of user-generated content searched for using the search query in the past 24 hours and determined to be malignant or benign as the malignancy of the search query. The generation unit 15b calculates an average value of the degrees of malignancy of the respective words of the key phrase as the degree of malignancy of the detection query.

For example, it is assumed that the number of pieces of malicious-user-generated content retrieved by a search query of a key phrase "ruby world cup streaming" is 20 and the number of pieces of benign user-generated content is 50 in a service in the past 24 hours. Further, it is assumed that the number of pieces of malicious-user-generated content retrieved by the search query of the key phrase "free live streaming" is 100, and the number of pieces of benign user-generated content is 100. Further, it is assumed that the number of pieces of malicious-user-generated content retrieved by the search query of the key phrase "rugby japan vs korea" is 10, and the number of pieces of benign user-generated content is 100.

In this case, the degree of malignancy of the word "japan" is $\alpha=10/(10+100)$. The degree of malignancy of the word "rugby" is $\beta=\{20/(20+50)+10/(10+100)\}/2$. Further, the degree of malignancy of the word "streaming" is $\gamma=\{20/(20++100/(100+100)\}/2$.

Therefore, the score of the degree of malignancy of the search query of the key phrase "Japan Rugby streaming" is calculated as $(\alpha+\beta+\gamma)/3=0.225$.

Thus, the generation unit 15b calculates the degree of malignancy of the search query for each service, and selects the search query whose calculated degree of malignancy is equal to or greater than a threshold value as the search query of the user-generated content which may become the malignancy of the service.

The collection unit 15c collects user-generated content generated in the plurality of services by using the generated search query. For example, the collection unit 15c collects user-generated content of other services by using a search query generated by the user-generated content of a certain service. Further, the collection unit 15c collects a plurality of kinds of user-generated content together with a generation date and time by using the same search query.

For example, the collection unit 15c applies the same search query to three kinds of collection URLs for a service a in which user-generated content of sentence posting, video posting, and event notification are generated, and collects the three kinds of user-generated content together with a posting (generation) date and time. The same search query is applied to a common collection URL for a service b in which user-generated content of video posting and video distribution are generated, and two kinds of user-generated content are collected together with a posting date and time.

Thus, the collection unit 15c can efficiently collect the user-generated content diffused in similar context at a specific timing. Especially, the collection unit 15c can easily and rapidly collect the user-generated content having high likelihood of being malignant for each service by using the search query which can be malignant, which has been selected by the generation unit 15b.

The collection unit 15c performs collection of the user-generated content by providing an upper limit to the collection amount, for example, as 100 queries per hour. This makes it possible to reduce a load of a server of each service that is a collection destination.

Figure 5:
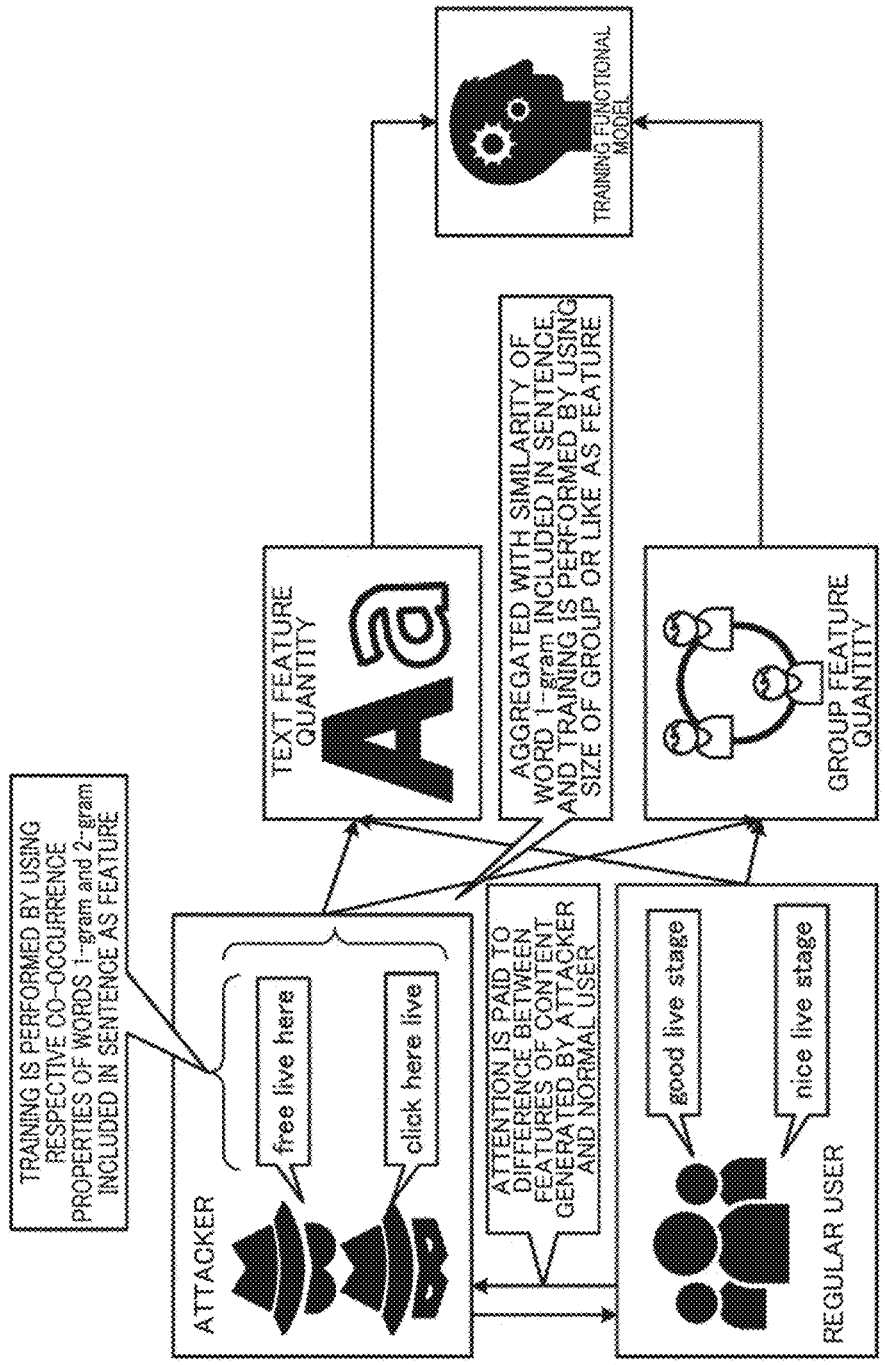
FIG. 5 is a diagram illustrating processing of a determination functional unit.

[Determination Functional Unit] FIG. 5 is a diagram illustrating processing of the determination functional unit. As illustrated in FIG. 5, the determination functional unit 15B acquires a machine training model representing each feature quantity through training by using a difference in features between the user-generated content generated by the attacker and the user-generated content generated by the normal user for a specific service. The determination functional unit 15B performs training of a machine training model by using a text feature quantity representing co-occurrence of phrases of the user-generated content and a group feature quantity representing a degree of similarity of words appearing in each piece of user-generated content as feature quantities.

Thus, the determination functional unit 15B can determine whether or not the user-generated content of the service generated thereafter is malignant by using the trained machine training model. For example, the determination functional unit 15B can perform the malignancy determination of a large amount of user-generated content of a specific service generated at the same time in real time.

The description will be returned to FIG. 2. The calculation unit 15d calculates a feature quantity of the user-generated content generated by the user in a predetermined service in a predetermined period. In the present embodiment, the feature quantity of the user-generated content is a text feature quantity representing a feature of a combination of words co-occurring in a plurality of pieces of the user-generated content, and a group feature quantity representing a feature regarding similarity of words between the plurality of pieces of the user-generated content generated in a predetermined period.

Here, FIGS. 6 to 9 are each a diagram illustrating processing performed by the calculation unit. First, the calculation unit 15d calculates a text feature quantity representing a feature of a combination of words co-occurring in a plurality of pieces of the user-generated content. Specifically, the calculation unit 15d calculates the text feature quantity of the set of user-generated content by using the optimized model of the distributed expression of words for each of phrases co-occurring in the set of collected user-generated content.

Figure 6:
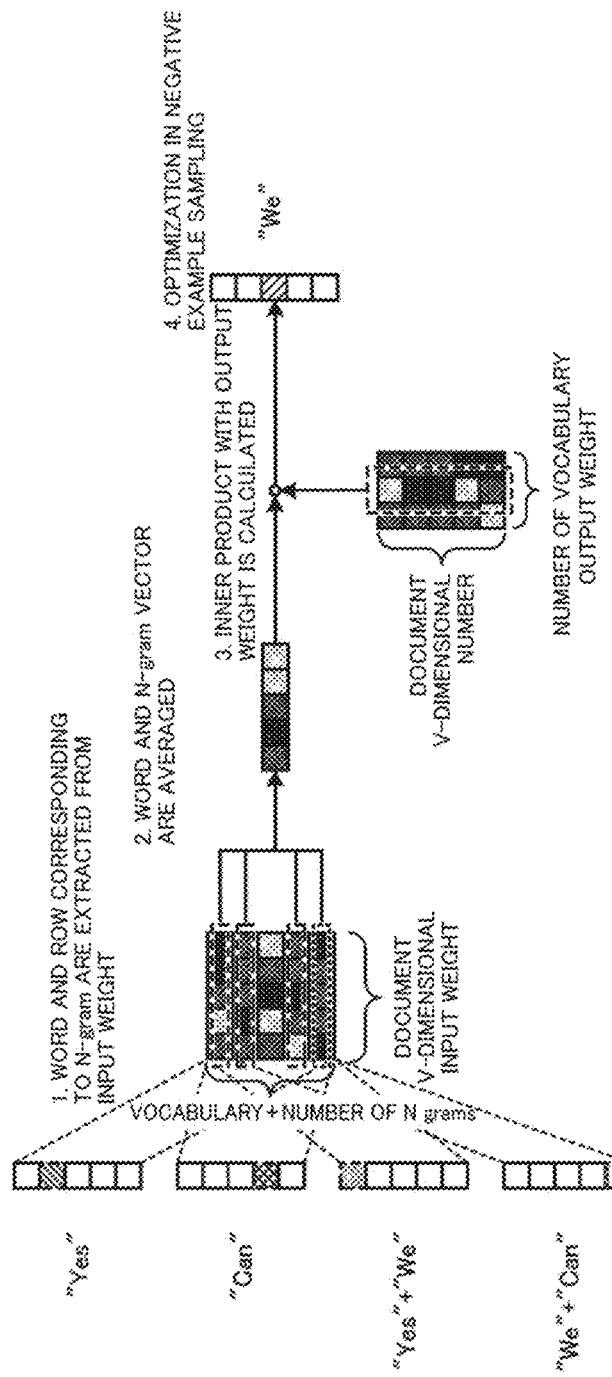
FIG. 6 is a diagram illustrating processing of a calculation unit.

More specifically, as illustrated in FIG. 6, the calculation unit 15d performs optimization of a model for outputting a feature vector of a distributed expression by phrases co-occurring in each piece of user-generated content of a set of user-generated content in advance. In the example illustrated in FIG. 6, the calculation unit 15d uses, as a weight of the input, a matrix (see 1.) in which each user-generated content (document) is in each column, with each of the word (phrase of 1-gram) and a phrase of 2-gram appearing in the set of the malicious user-generated content as each row. Further, the calculation unit 15d calculates an average of each line corresponding to each phrase (see 2.).

Further, the calculation unit 15d calculates an inner product by using a matrix in which each document is set as each row and each word is set as each column as a weight of an output (see 3.), and performs optimization of the model for outputting the feature vector of the distributed expression of each phrase (see 4.).

As illustrated in FIG. 7, the calculation unit 15d first extracts, for a set U of collected user-generated content, a word existing in the dictionary from a character string of the URL in the content, and performs replacement with the character string of the URL (word segmentation).

Further, the calculation unit 15d performs optimization of the model of the distributed expression as illustrated in FIG. 6 for a word (a phrase of 1-gram) appearing in the set U of user-generated content and a phrase of 2-gram in advance. The calculation unit 15d uses an optimized model of the distributed expression to generate a set of feature vectors $VEC_u$ of each piece of user-generated content u (Word Embeddings). The calculation unit 15d calculates the average of the feature vectors $VEC_u$ of the respective user-generated content u as the text feature quantity of the set of the user-generated content.

Here, even in events at different timings, there is a tendency that many similar words exist in the malicious-user-generated content. Thus, for the set U of malicious user-generated content, the average of the feature vectors $VEC_u$ of each piece of user-generated content u calculated as described above can be a feature quantity reflecting the feature of the set U of user-generated content.

Further, the calculation unit 15d calculates the group feature quantity representing a feature regarding similarity of words between the plurality of pieces of the user-generated content generated in a predetermined period. Specifically, as illustrated in FIG. 8, the calculation unit 15d applies a Minhash-LSH algorithm to appearing words (a phrase of 1-gram), for the set U of user-generated content collected at the same time, to calculate a similarity between the respective pieces of user-generated content. Here, the same time means that a time difference from generation date and times is within a predetermined time threshold value $\sigma$. When the calculated similarity exceeds a predetermined similarity threshold value $\tau$, the calculation unit 15d sets the set of user-generated content as a similar user-generated content set.

The calculation unit 15d identifies a group feature quantity for a similar user-generated content set. The group feature quantity is a size of the set, the number of users in the set, the number of unique URLs described in the set, an average number of URLs described in the user-generated content in the set, or an average posting time interval in the set.

For example, as illustrated in FIG. 9, the calculation unit 15d determines whether or not the user-generated content set is a similar user-generated content set for each collected user-generated content set, and specifies the group feature quantity when the user-generated content is the similar user-generated content set.

In FIG. 9, for example, it is illustrated that user-generated content 1 is generated by the user 1, and appearing words are "free live streaming URL 1 URL1". Further, it is illustrated that the pieces of user-generated content 1, 2, and 3 are the same similar user-generated content set. Further, it is illustrated that, as the group feature quantity of the similar user-generated content set, the average posting time interval, the size of the set is 3, that the number of unique users of the set is 2 (user1, user2), that the number of unique URLs of the set is 2 (URL1, URL2), and that the average number of URLs of 1 content is 1.67.

Further, it is illustrated that user-generated content 4 and 5 are the same similar user-generated content set. Further, it is illustrated that the user-generated content 6 and 7 are not similar user-generated content sets.

Here, the malicious user-generated content tends to be spread at the same time in a similar context. Thus, it is possible to specify the group feature quantity as described above for the malicious-user-generated content set. That is, when the group feature quantity can be specified in this way, this means that the set of user-generated content is highly likely to be malignant.

Description is returned to FIG. 2. The training unit 15e performs training by using the calculated feature quantity of the user-generated content generated by the normal user and the feature quantity of the content generated by the malicious user. The determination unit 15f determines whether or not the user-generated content is generated by the malicious user using a trained model.

Specifically, the training unit 15e performs training with a teacher of a machine training model by using the text feature quantity representing co-occurrence of phrases of the user-generated content and the group feature quantity representing the degree of similarity of the words appearing in each piece of user-generated content. Further, the determination unit determines whether or not the user-generated content of the service acquired thereafter is malignant by using the trained machine training model.

Thus, the determination functional unit 15B trains the feature of the user-generated content generated at a specific timing such as an event and having a high likelihood of being malignant, and performs the malignancy determination of the user-generated content collected in real time by using the training result.

Figure 10:
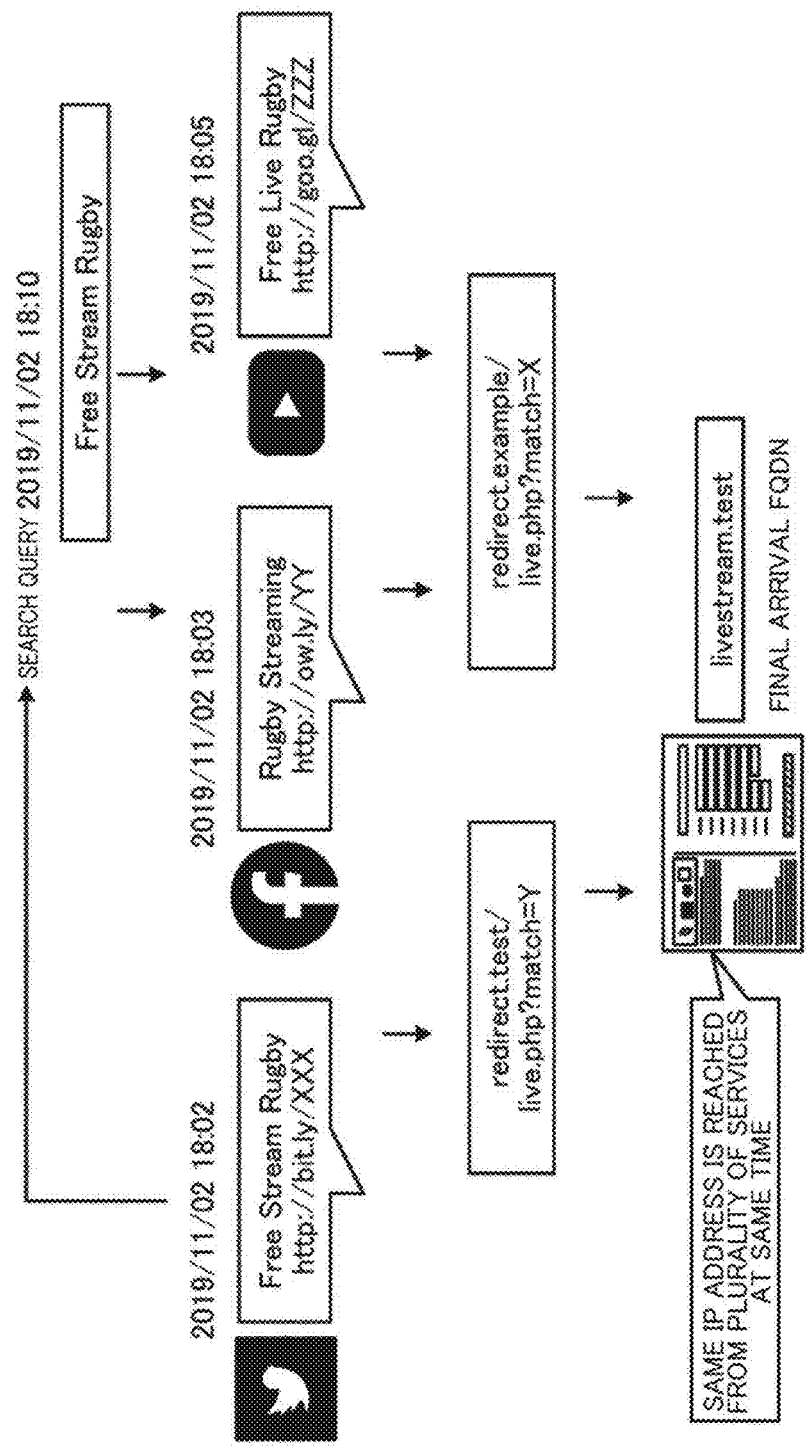
FIG. 10 is a diagram illustrating processing of an extraction functional unit.

[Extraction Functional Unit] FIG. 10 is a diagram illustrating processing of the extraction functional unit. As illustrated in FIG. 10, the extraction functional unit 15C extracts the feature quantity of the Web content obtained by accessing the URL included in the user-generated content in an arbitrary service. For example, the extraction functional unit 15C identifies the IP address of a fully qualified domain name (FQDN) that finally reaches.

The extraction functional unit 15C trains the user-generated content generated by the attacker and user-generated content generated by the normal user by using the feature quantity. The extraction functional unit 15C uses the trained feature quantity to perform the malignancy determination on the user-generated content generated in large amount by an arbitrary service at the same time.

When it is determined that the content is malicious user-generated content, the extraction functional unit 15C extracts threat information that is a feature that can be a threat from the malicious user-generated content, and outputs a threat report. Thus, the extraction functional unit 15C can detect an attack that may become a threat in real time.

The description will be returned to FIG. 2. The extraction unit 15g accesses the entrance URL described in the user-generated content generated by the user in a plurality of services in a predetermined period to extract the feature quantity of the user-generated content. The extracted feature quantity includes a feature quantity regarding the Web content of the reached Web site and a feature quantity regarding a plurality of pieces of the user-generated content generated in a predetermined period.

Specifically, the extraction unit 15g first accesses the entrance URL by using the URL described in the collected user-generated content as the entrance URL, and specifies the URL of the finally reached site, that is, the arrival URL. When the entrance URL is one using a URL shortening service, this is regarded as the entrance URL as it is.

Here, the URL described in the user-generated content includes a large number of URLs that use the URL shortening service such as bit[.]ly, tinyuri[.]com. The URL shortening service is a service for converting a long URL into a short and simple URL and issuing the URL. In most of URL shortening services, long URLs of other sites are associated with short URLs issued under control of the services, redirection to an original long URL is performed when there is access to the short URL.

The extraction unit 15g creates a Web crawler by combining a Scrapy of a scraping framework with a headless browser Splash capable of performing Javascript (registered trademark) Rendering, for example. Thus, the extraction unit 15g accesses the URL described in the user-generated content and records communication information.

For example, the extraction unit 15g records the Web content of the Web site that is finally reached, and the number of times of redirection. When a communication pattern is a communication pattern in which a transition occurs in order of an entry URL "bit.ly/aaa"→"redirect.com/"→arrival URL "malicious.com", Web content or the like of the final reached Web site "malicious.com" is recorded with two times of redirection.

The extraction unit 15g extracts a feature quantity of the Web content such as the number of tags of each HTML of the arrival site, a distributed expression of the character string displayed on the arrival site, the number of times of redirection, and the number of FQDNs (fully qualified domain names) that transition from the entrance URL to the arrival URL. Here, tags recorded in HTML are, for example, tags of TOP 30 frequently appearing in a malignant site, so that the extraction unit 15g can extract the feature quantity of the malicious user-generated content.

Further, the extraction unit 15g specifies an IP address of FQDN that is finally reached. When the same IP address is reached from a plurality of services at the same time, the extraction unit 15g sets the set of the user-generated content as a similar user-generated content set.

The extraction unit 15g extracts, for the similar user-generated content set, a feature quantity of the user-generated content such as the number of pieces of user-generated content in the set, the number of services, the number of entrance URLs, the number of users, and a distributed expression of text.

The training unit 15*e* performs training by using the extracted feature quantity of the user-generated content generated by the normal user and the feature quantity of the content generated by the malicious user. Further, the determination unit 15*f* determines whether or not the user-generated content is generated by the malicious user by the trained model.

Specifically, the training unit 15*e* performs training with a teacher of the machine training model by using the extracted feature quantity regarding the Web content of the final reached Web site, and the feature quantity regarding the user-generated content generated at the same time. Further, the determination unit 15*f* determines whether or not the user-generated content of the service acquired thereafter is malignant by using the trained machine training model.

Thus, the training unit 15*e* trains feature of the user-generated content set which is generated in a similar context at a specific timing such as an event and has a high likelihood of being malignant, in which URLs reaching the same IP address are described. Therefore, the determination unit can perform the malignancy determination of the user-generated content collected in real time by using the training result.

Figure 12:
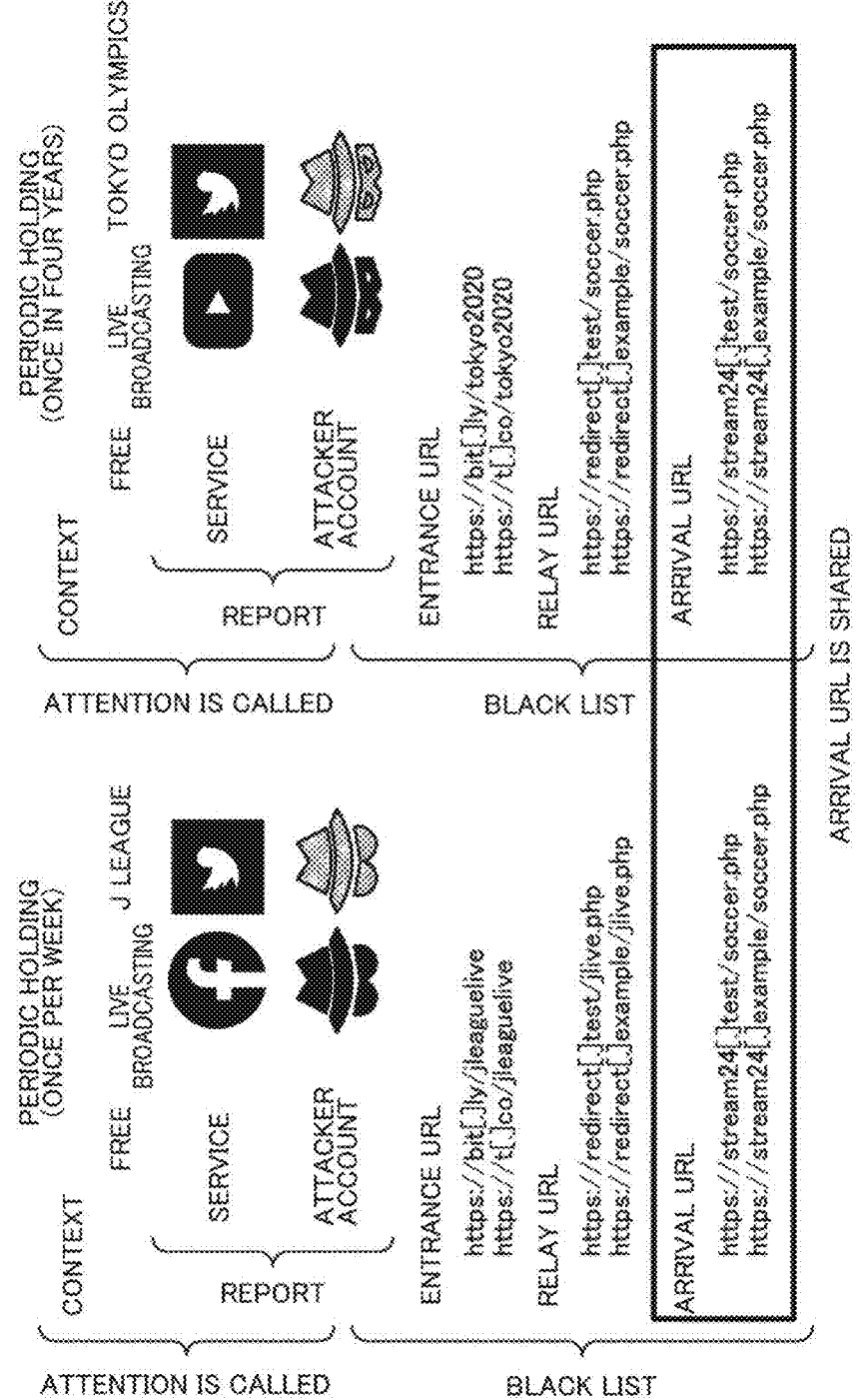
FIG. 12 is a diagram illustrating the threat information.

When it is determined that the user-generated content is generated by the malicious user, the extraction unit 15*g* outputs the feature of the attack of the user-generated content as threat information. FIGS. 11 and 12 are drawings illustrating the threat information. As illustrated in FIG. 11, the threat information includes, for example, a key phrase included in the user-generated content, and an entrance URL and an arrival URL described in the user-generated content of each service. In the example illustrated in FIG. 11, the user-generated content of the service a and the service b including the key phrase "ruby world cup", the entrance URL described in the content, and the arrival URL common to the service a and the service b are shown. The extraction unit outputs the threat information to a predetermined provision destination via an output unit 12 or a communication control unit 13.

More specifically, as illustrated in FIG. 12, attention calling such as notification to the provision destination, a black list, and the like are provided as the threat information. In the example illustrated in FIG. 12, for example, attention is called to user-generated content in context including words "regular holding (once a week), free, live broadcasting, J-League" and the like. In particular, an account of an attacker using this context and an abused service have been reported. A blacklist including the entrance URL described in the user-generated content, a relay URL transitioning from the entrance URL, and the arrival URL finally reaching from the relay URL is presented.

Further, in the example illustrated in FIG. 12, a malignant site with a common arrival URL is present for malignant user-generated content in the above context, and malignant user-generated content in the context including words "regular holding (once every four years), free, live broadcasting, Tokyo Olympics", and the like.

Thus, the extraction functional unit 15C performs the malignancy determination on the user-generated content generated in large amount by an arbitrary service at the same time and having a high likelihood of being malignant by using the feature quantity obtained by accessing the entrance URL. When it is determined that the content is the malicious user-generated content, the extraction functional unit 15C extracts threat information from the malicious user-generated content and outputs a threat report. Thus, the extraction functional unit 15C can detect an attack which may become a threat in real time in the user-generated content generated in large amount by an arbitrary service at the same time and having a high likelihood of being malignant, and output attack information.

When the determination functional unit 15B determines that the content is the malicious user-generated content, the extraction unit 15*g* may output features of an attack such as a character string or a URL included in guide context of the user-generated content as threat information.

Figure 13:
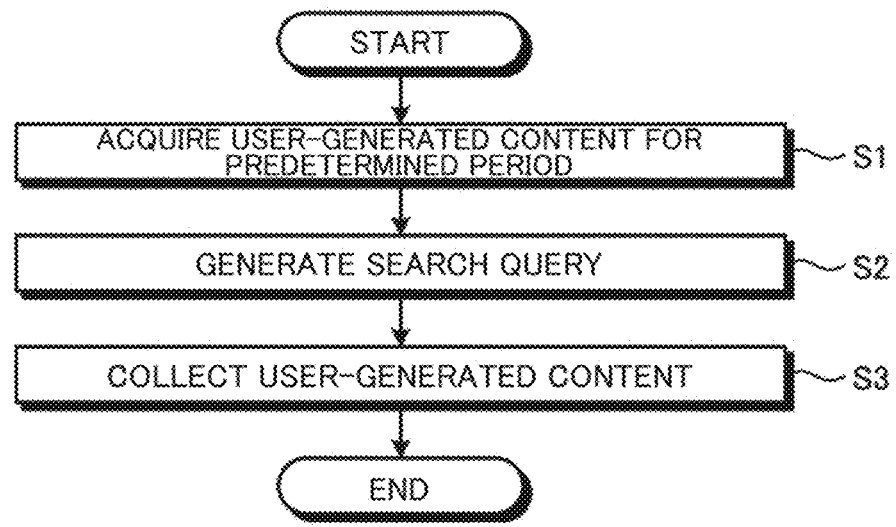
FIG. 13 is a flowchart illustrating a processing procedure of a collection functional unit.

[Detection processing] Next, detection processing of the detection device 1 according to the present embodiment will be described with reference to FIGS. 13 to 17. FIG. 13 is a flowchart illustrating a collection processing procedure of a collection functional unit. The flowchart illustrated in FIG. 13 is started at a timing when an operation input for an instruction to start is performed by the user, for example.

First, the acquisition unit 15*a* acquires user-generated content generated in each service in a predetermined period (step S1). Specifically, the acquisition unit 15*a* acquires the user-generated content from a server or the like of each service via the input unit 11 or the communication control unit 13.

Next, the generation unit 15*b* generates a search query by using words appearing in the user-generated content for each service. For example, the generation unit 15*b* generates the search query by using a combination of appearing words (step S2).

The generation unit 15*b* calculates the malignancy of the search query for each service, and selects the search query whose calculated malignancy is equal to or greater than a threshold value as the search query of the user-generated content which may become the malignancy of the service. The collection unit 15*c* collects the user-generated content generated in a predetermined service by using the selected search query (step S3). Thus, a series of detection processing ends.

Figure 14:
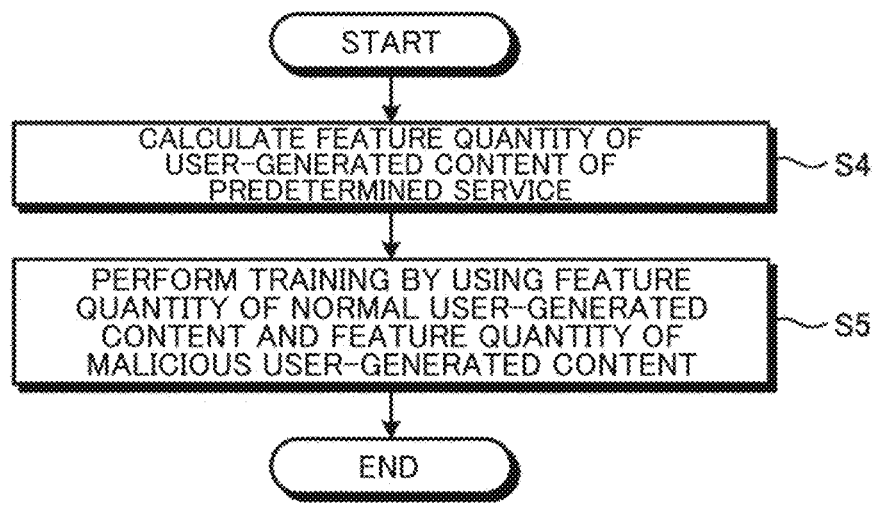
FIG. 14 is a flowchart illustrating a processing procedure of a determination functional unit.
Figure 15:
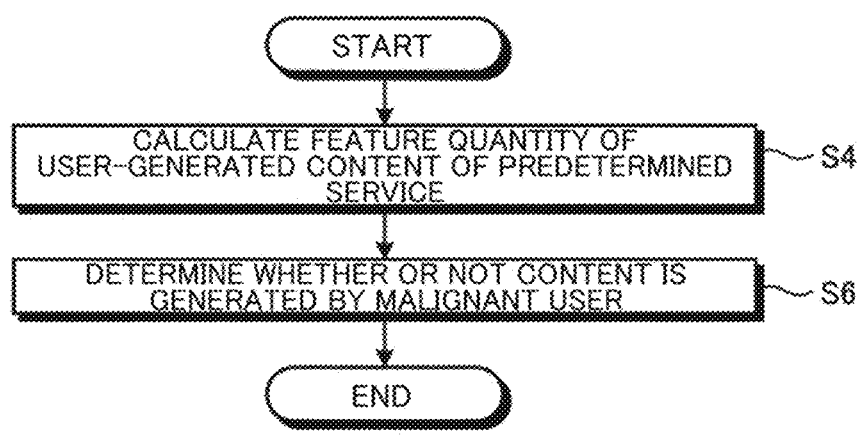
FIG. 15 is a flowchart illustrating a processing procedure of the determination functional unit.

Next, FIGS. 14 and 15 are flowcharts illustrating a processing procedure of a determination functional unit. Further, the flowchart illustrated in FIG. 14 shows training processing in the determination functional unit 15B, and is started at a timing when an operation input for an instruction to start is performed by the user, for example.

The calculation unit 15*d* calculates the feature quantity of the user-generated content of the predetermined service collected by the collection functional unit 15A in a predetermined period (step S4). Specifically, the calculation unit 15*d* calculates the text feature quantity representing the feature of the combination of the words co-occurring in the plurality of pieces of the user-generated content, and the group feature quantity representing a feature regarding similarity of words between the plurality of pieces of the user-generated content generated in a predetermined period.

Further, the training unit 15*e* performs training by using the calculated feature quantity of the user-generated content generated by the normal user and the feature quantity of the content generated by the malicious user (step S5). With this, a series of training processing is completed.

The flowchart illustrated in FIG. 15 shows training processing in the determination functional unit 15B, and is started at a timing when an operation input for an instruction to start is performed by the user, for example.

The calculation unit 15d calculates the feature quantity of the user-generated content of the predetermined service collected by the collection functional unit 15A in the predetermined period (step S4).

Then, the determination unit 15f determines whether or not the user-generated content is generated by a malicious user using the trained model (step S6). Accordingly, a series of determination processing ends.

Figure 16:
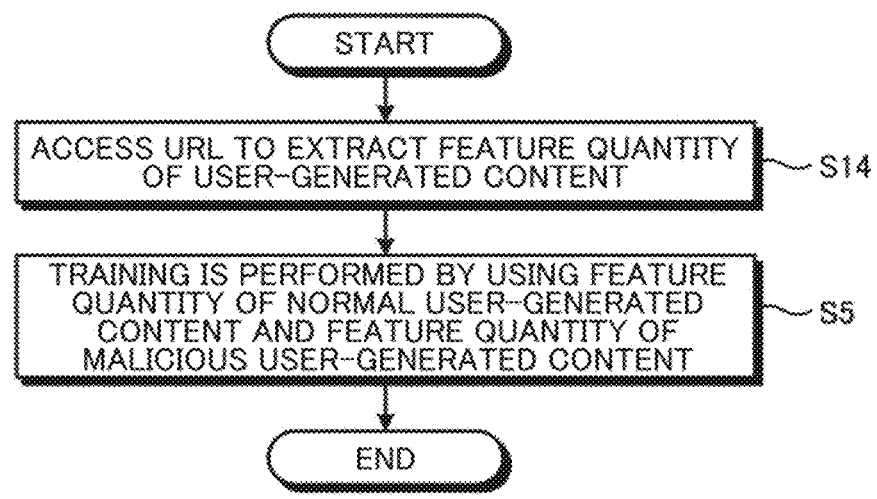
FIG. 16 is a flowchart illustrating a processing procedure of an extraction functional unit.
Figure 17:
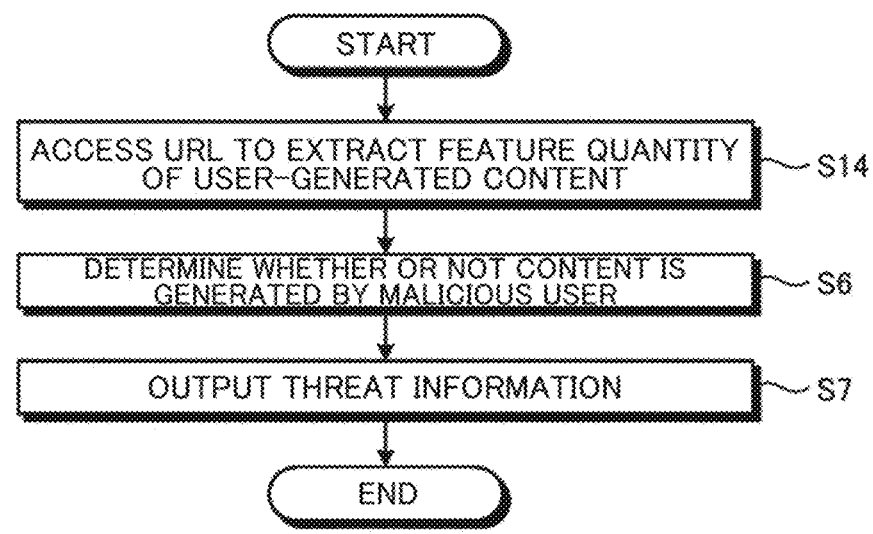
FIG. 17 is a flowchart illustrating a processing procedure of an extraction functional unit.

FIGS. 16 and 17 are flowcharts illustrating a processing procedure of the extraction functional unit. The flowchart illustrated in FIG. 16 shows training processing in the extraction functional unit 15C, and is started at a timing when an operation input for an instruction to start is performed by the user, for example.

First, the extraction unit 15g accesses an entrance URL described in user-generated content of a plurality of services collected by the collection functional unit 15A in a predetermined period, and extracts a feature quantity of the user-generated content (step S14). Specifically, the extraction unit 15g extracts the feature quantity regarding the Web content of the reached Web site and the feature quantity regarding the plurality of pieces of the user-generated content generated in the predetermined period.

Further, the training unit 15e performs training by using the extracted feature quantity of the user-generated content generated by the normal user and the feature quantity of the content generated by the malicious user (step S5). With this, a series of training processing is completed.

The flowchart illustrated in FIG. 17 shows training processing in the extraction functional unit 15C, and is started at a timing when an operation input for an instruction to start is performed by the user, for example.

First, the extraction unit 15g accesses an entrance URL described in user-generated content of a plurality of services collected by the collection functional unit 15A in a predetermined period, and extracts a feature quantity of the user-generated content (step S14).

Further, a determination unit 15f determines whether or not the user-generated content is generated by a malicious user using the trained model (step S6).

When the determination unit 15f determines that the user-generated content is generated by the malicious user, the extraction unit 15g outputs the feature of the attack of the user-generated content as threat information (step S7). Accordingly, a series of determination processing ends.

A process of step S7 may be performed after a process of step S6 illustrated in FIG. 15, similarly to the processing of FIG. 17. That is, when the determination functional unit 15B determines that the user-generated content is generated by the malicious user, the extraction unit 15g may output a feature of the attack of the user-generated content as threat information.

As described above, in the collection functional unit 15A of the present embodiment, the acquisition unit 15a acquires the user-generated content generated in each service in a predetermined period. Further, the generation unit 15b generates a search query by using words appearing in the user-generated content for each service. The collection unit 15c collects user-generated content generated in the plurality of services by using the generated search query.

This makes it possible for the collection functional unit 15A to efficiently collect the user-generated content which are diffused in a similar context at a specific timing and have high likelihood of being malignant. This makes it possible for the detection device 1 to perform rapid and accurate detection of malignant sites over a wide area.

Further, the generation unit 15b selects a search query which may become malignant for each service. This makes it possible for the collection functional unit 15A to easily and rapidly collect the user-generated content having a high likelihood of being malignant for each service.

Further, in the determination functional unit 15B, the calculation unit 15d calculates the feature quantity of the user-generated content generated by the user in a predetermined period. The training unit 15e performs training by using the calculated feature quantity of the user-generated content generated by the normal user and the feature quantity of the content generated by the malicious user. Further, the determination unit 15f determines whether or not the user-generated content is generated by the malicious user by the trained model.

This makes it possible for the determination functional unit 15B to train the feature of the user-generated content generated at a specific timing such as an event, and perform the malignancy determination of the user-generated content collected in real time by using a training result. Thus, the determination functional unit 15B can rapidly and accurately detect the malignant site.

The feature quantity of the user-generated content calculated by the calculation unit 15d includes the text feature quantity representing the feature of the combination of words co-occurring in the plurality of pieces of the user-generated content, and the group feature quantity representing a feature regarding similarity of words between the plurality of pieces of the user-generated content generated in a predetermined period.

This makes it possible for the determination functional unit 15B to perform training by using the feature of the user-generated content having high likelihood of being malignant, and perform the malignancy determination of the user-generated content collected in real time by using the training result.

Further, in the extraction functional unit 15C, the extraction unit 15g accesses the entrance URL described in the user-generated content generated by the user in a plurality of services in a predetermined period to extract the feature quantity of the user-generated content. Further, the training unit 15e performs training by using the extracted feature quantity of the user-generated content generated by the normal user and the feature quantity of the content generated by the malicious user. Further, the determination unit 15f determines whether or not the user-generated content is generated by the malicious user using the trained model.

This makes it possible for the extraction functional unit 15C to perform the malignancy determination of the user-generated content collected in real time by using the feature of the user-generated content of various services generated at a specific timing such as an event. Thus, the extraction functional unit 15C can perform rapid and accurate detection of malignant sites over a wide area.

The feature quantity extracted by the extraction unit 15g includes the feature quantity regarding the Web content of the reached Web site, and the feature quantity regarding the plurality of pieces of the user-generated content generated in the predetermined period. This makes it possible for the extraction functional unit 15C to extract threat information of a valid malignant site.

When it is determined that the user-generated content is generated by the malicious user, the extraction unit 15g outputs a feature of an attack of the user-generated content as threat information. This makes it possible for the extraction functional unit 15C to present the threat information of the valid malignant site to a predetermined provision destination.

Further, in the detection device 1 of the present embodiment, the acquisition unit 15a acquires the user-generated content generated in each service in a predetermined period. Further, the generation unit 15b generates a search query by using words appearing in the user-generated content for each service. The collection unit 15c collects user-generated content generated in the plurality of services by using the generated search query. Further, the calculation unit 15d calculates the feature quantity of the user-generated content of the collected predetermined service. The training unit 15e performs training by using the feature quantity of the user-generated content generated by the normal user and the feature quantity of the content generated by the malicious user. Further, the determination unit 15f determines whether or not the user-generated content is generated by the malicious user using the trained model. When it is determined that the user-generated content is generated by the malicious user, the extraction unit 15g accesses the entrance URL described in the user-generated content and outputs the feature of the attack of the user-generated content as threat information.

This makes it possible for the detection device 1 to rapidly detect the malicious user-generated content by using feature of the user-generated content generated at a specific timing such as an event, and present the threat information of the valid malignant site to a predetermined provision destination. Thus, the detection device 1 can rapidly detect a malignant site in a wide range.

Further, the generation unit 15b selects a search query which may become malignant for each service. This makes it possible for the detection device 1 to easily collect the user-generated content having high likelihood of being malignant and detect the malignant user-generated content more rapidly.

Further, the feature quantity of the user-generated content calculated by the calculation unit 15d includes a text feature quantity representing the feature of the combination of words co-occurring in the plurality of pieces of the user-generated content, and the group feature quantity representing a feature regarding similarity of words between the plurality of pieces of the user-generated content generated in a predetermined period. This makes it possible for the detection device 1 to more rapidly detect malicious user-generated content with the user-generated content having high likelihood of being malicious as a processing target.

The training unit 15e performs training by using the feature quantity of the user-generated content of the plurality of services extracted by the extraction unit 15g, and the determination unit 15f determines whether or not the user-generated content of the plurality of services are generated by a malicious user. This makes it possible for the malicious user-generated content to be detected more rapidly by using the feature of the user-generated content of an arbitrary service.

The feature quantity extracted by the extraction unit 15g includes the feature quantity regarding the Web content of the reached Web site, and the feature quantity regarding the plurality of pieces of the user-generated content generated in the predetermined period. This makes it possible for the detection device 1 to present threat information of the valid malignant site to the predetermined provision destination.

[Program] A program in which the processing that is executed by the detection device 1 according to the embodiment has been described in a computer-executable language can be created. As an embodiment, the detection device 1 can be implemented by a detection program executing the detection processing being installed as packaged software or online software in a desired computer. For example, an information processing device can be caused to function as the detection device 1 by the information processing device being caused to execute the detection program. The information processing device described here includes a desktop or laptop personal computer. In addition, a mobile communication terminal such as a smart phone, a mobile phone, or a personal handyphone system (PHS), or a slate terminal such as a personal digital assistant (PDA), for example, is included in a category of the information processing device. Further, functions of the detection device 1 may be implemented in a cloud server.

Figure 18:
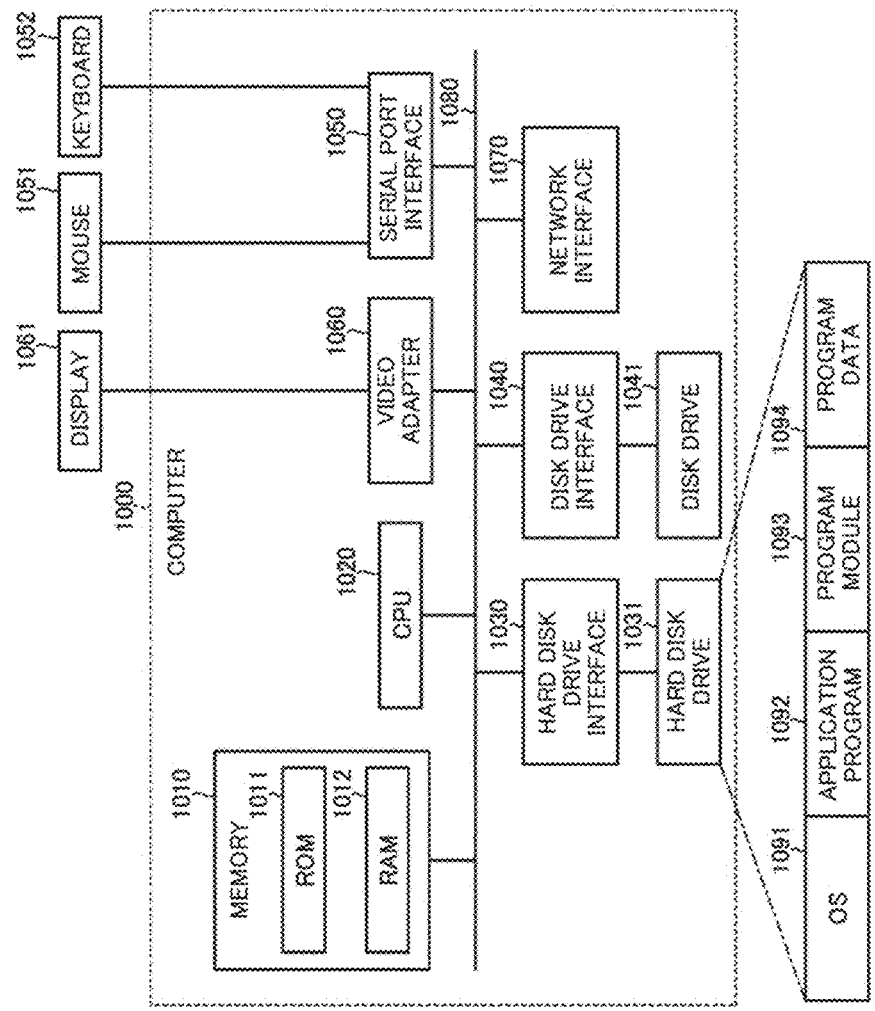
FIG. 18 is a diagram illustrating an example of a computer that executes a detection program.

FIG. 18 is a diagram illustrating an example of a computer that executes the detection program. A computer 1000 includes, for example, a memory 1010, a CPU 1020, a hard disk drive interface 1030, a disc drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores, for example, a boot program such as a Basic Input Output System (BIOS). The hard disk drive interface 1030 is connected to a hard disk drive 1031. The disc drive interface 1040 is connected to a disc drive 1041. A detachable storage medium such as a magnetic disk or an optical disc, for example, is inserted into the disc drive 1041. A mouse 1051 and a keyboard 1052, for example, are connected to the serial port interface 1050. A display 1061, for example, is connected to the video adapter 1060.

Here, the hard disk drive 1031 stores, for example, an OS 1091, an application program 1092, a program module 1093, and program data 1094. The respective pieces of information described in the embodiment are stored in, for example, the hard disk drive 1031 or the memory 1010.

Further, the detection program, for example, is stored in the hard disk drive 1031 as the program module 1093 in which commands to be executed by the computer 1000 have been described. Specifically, the program module 1093 in which each processing executed by the detection device 1 described in the embodiment has been described is stored in the hard disk drive 1031.

Further, data to be used in information processing according to the detection program is stored, for example, in the hard disk drive 1031 as the program data 1094. The CPU 1020 reads the program module 1093 or the program data 1094 stored in the hard disk drive 1031 into the RAM 1012, as necessary, and executes each of the above-described procedures.

The program module 1093 or the program data 1094 related to the detection program is not limited to being stored in the hard disk drive 1031. For example, the program module 1093 or the program data 1094 may be stored on a detachable storage medium and read by the CPU 1020 via the disc drive 1041 or the like. Alternatively, the program module 1093 or the program data 1094 related to the detection program may be stored in another computer connected via a network such as a local area network (LAN) or a wide area network (WAN) and read by the CPU 1020 via the network interface 1070.

Although the embodiment to which the invention made by the present inventor has been applied has been described above, the present invention is not limited by the description and the drawings that form a part of the disclosure of the present invention according to the present embodiment. That is, other embodiments, examples, operational technologies, and the like made by those skilled in the art or the like on the basis of the present embodiment are all included in the category of the present invention.

REFERENCE SIGNS LIST

1 Detection device
11 Input unit
12 Output unit
13 Communication control unit
14 Storage unit
15 Control unit
15A Collection functional unit
15B Determination functional unit
15C Extraction functional unit
15a Acquisition unit
15b Generation unit
15c Collection unit
15d Calculation unit
15e Training unit
15f Determination unit
15g Extraction unit

The invention claimed is:

1. An extraction device comprising:
processing circuitry configured to:
access an entrance uniform resource locator (URL) described in first user-generated content generated by a user in a plurality of services in a predetermined period to extract a first feature quantity of first the user-generated content;
perform training on a model by using a second feature quantity extracted from second user-generated content generated by a normal user and a third feature quantity of third user-generated content generated by a malicious user; and
determine, in real time, whether or not the first user-generated content has been generated by the malicious user using the model after training,
wherein the first, second, and third feature quantities include a text feature quantity and a group feature quantity, and
the group feature quantity represents a degree of similarity among a group of words in user-generated content.

2. The extraction device according to claim 1, wherein the first, second, and third feature include quantities a feature quantity regarding Web content of a reached Web site, and a feature quantity regarding a plurality of pieces of the user-generated content generated in a predetermined period.

3. The extraction device according to claim 1,
wherein the processing circuitry is further configured to output a feature of an attack of the first user-generated content as threat information when the first user-generated content is determined to be generated by the malicious user.

4. The extraction device according to claim 1, wherein the text feature quantity represents a combination of words co-occurring in user-generated content.

5. The extraction device according to claim 1, wherein at least the first user-generated content generated by the user is streaming content generated in real time.

6. An extraction method executed by an extraction device, the extraction method comprising:
accessing an entrance uniform resource locator (URL) described in first user-generated content generated by a user in a plurality of services in a predetermined period to extract a first feature quantity of the first user-generated content;
performing training on a model by using a second feature quantity extracted from second user-generated content generated by a normal user and a third feature quantity extracted from third user-generated content generated by a malicious user; and
determining, in real time, whether or not the first user-generated content has been generated by the malicious user using the model after training,
wherein the first, second, and third feature quantities include a text feature quantity and a group feature quantity, and
the group feature quantity represents a degree of similarity among a group of words in user-generated content.

7. The extraction method according to claim 6, wherein the text feature quantity represents a combination of words co-occurring in user-generated content.

8. The extraction method according to claim 6, wherein at least the first user-generated content generated by the user is streaming content generated in real time.

9. A non-transitory computer-readable recording medium storing therein an extraction program that causes a computer to execute a process comprising:
accessing an entrance uniform resource locator (URL) described in first user-generated content generated by a user in a plurality of services in a predetermined period to extract a first feature quantity of the first user-generated content;
performing training on a model by using a second feature quantity extracted from second user-generated content generated by a normal user and a third feature quantity extracted from third user-generated content generated by a malicious user; and
determining, in real time, whether or not the first user-generated content has been generated by the malicious user using the model after training,
wherein the first, second, and third feature quantities include a text feature quantity and a group feature quantity, and
the group feature quantity represents a degree of similarity among a group of words in user-generated content.

10. The non-transitory computer-readable recording medium according to claim 9, wherein the text feature quantity represents a combination of words co-occurring in user-generated content.

11. The non-transitory computer-readable recording medium according to claim 9, wherein at least the first user-generated content generated by the user is streaming content generated in real time.

* * * * *